United States Patent
Fukuda et al.

(10) Patent No.: US 6,425,742 B1
(45) Date of Patent: Jul. 30, 2002

(54) DISCHARGE SILENCER PROVIDED WITH DRAIN RECOVERING FUNCTION

(75) Inventors: Akito Fukuda; Daisuke Yoshioka, both of Yamaguchi (JP)

(73) Assignee: Taiko Kikai Industries, Ltd., Tokyo (JP)

( * ) Notice: Subject to any disclaimer, the term of this patent is extended or adjusted under 35 U.S.C. 154(b) by 0 days.

(21) Appl. No.: 09/647,232

(22) PCT Filed: Apr. 30, 1998

(86) PCT No.: PCT/JP98/01980

§ 371 (c)(1),
(2), (4) Date: Sep. 22, 2000

(87) PCT Pub. No.: WO99/49218

PCT Pub. Date: Sep. 30, 1999

(30) Foreign Application Priority Data

Mar. 25, 1998 (JP) ............................................. 10-077241

(51) Int. Cl.[7] ................................................. F04B 35/02
(52) U.S. Cl. ........................ 417/317; 417/312; 181/212
(58) Field of Search ................................ 417/317, 312, 417/243; 181/210, 260, 212, 217, 218, 247, 231, 256; 96/388

(56) References Cited

U.S. PATENT DOCUMENTS

| | | | | |
|---|---|---|---|---|
| 1,061,775 A | * | 5/1913 | Newton et al. ............... | 181/260 |
| 3,642,384 A | * | 2/1972 | Huse ............................. | 417/205 |
| 3,941,206 A | * | 3/1976 | Halter ........................... | 181/256 |
| 4,234,325 A | * | 11/1980 | Rea ................................ | 96/388 |
| 4,428,453 A | * | 1/1984 | Yuen et al. ................... | 181/231 |
| 6,213,827 B1 | * | 4/2001 | Hattori et al. ................. | 440/89 |

FOREIGN PATENT DOCUMENTS

| | | |
|---|---|---|
| DE | 1 166 970 | 4/1964 |
| JP | 40-16585 | 4/1965 |
| JP | 62-29775 | 2/1987 |
| JP | 62-29775 A | 2/1987 |
| JP | 2-124295 U | 10/1990 |
| JP | 2-124295 | 10/1990 |

OTHER PUBLICATIONS

Copy of Germany Office Action mailed Feb. 13, 2002, and its English translation.

* cited by examiner

Primary Examiner—Teresa Walberg
Assistant Examiner—Quang Van
(74) Attorney, Agent, or Firm—Baker & Daniels

(57) ABSTRACT

The silencer 22 having an enclosed tank 23 includes an inlet port 24 positioned at one side of the tank 23, a discharge port 25 positioned at another side of the tank 23, and a partition plate 26 separating an inner space of the tank 23 into an inlet side chamber and an outlet side chamber. The partition plate 26 is formed with an orifice 27 communicating the separated chambers with each other. The partition plate 26 is also provided with a drain hole 28 communicating with both the chambers. The tank 23 is located at a position lower than the vacuum pump 12. A drain discharge line 33 may communicate with a lower portion of a casing of the vacuum pump 12. Furthermore, the tank may have a cooling water jacket 31 for cooling a wall of the tank 23.

5 Claims, 2 Drawing Sheets

DISCHARGE SILENCER PROVIDED WITH DRAIN RECOVERING FUNCTION

FIELD OF THE INVENTION

The present invention relates to a silencer provided in a discharge line connected to an axial, screw type vacuum pump for suction of a gas including a condensing substance.

BACKGROUND OF THE INVENTION

An axial, screw type vacuum pump has been used for many applications in various fields such as gas vacuuming, gas suction, cleaning, pneumatic conveying of powder/particle and viscous materials, etc.

In the vacuum pump for suction of a gas including an entrained substance like a solvent, the entrained substance included in the gas is delivered in a low pressure side of the vacuum pump. The entrained substance condenses to a drain in a discharge side of the vacuum pump under an atmospheric pressure. The drain partially accumulates in the vacuum pump and the remaining major part of the drain accumulates in a discharge line contiguous to a discharge outlet of the vacuum pump. An excessive amount of the accumulation in the discharge line flows backward into the vacuum pump.

The condensed drain, which is a non-compressible fluid, has caused problems such as a damage of an axial sealing of the vacuum pump, an over load condition of the vacuum pump, and seizing of a rotor of the vacuum pump due to the over load.

Thus, for handling a gas including a condensable substance, there has been provided a method for heating the condensable component up to a temperature at which the condensable substance vaporizes by means of a heater disposed around the discharge line or a method of using a drain tank positioned lower than the vacuum pump for recovering the drain.

For handling an ignitable gas, the method for heating the discharge line must eliminate a fear of an explosion accident. Therefore, the vacuum pump is positioned on a base frame to be higher than the drain tank, and a silencer provided in the discharge line is located separately from the vacuum pump. A drain accumulated in the silencer is dropped into the drain tank disposed lower than the silencer.

FIG. 3 is an illustration showing a general arrangement of a solvent recovery system having the vacuum pump, which is arranged along flow steps of a gas including a solvent. In the system, a mixing tank 1 is mounted with a motor 2 at the top thereof. The motor 2 has an output shaft coupled with a rotational shaft 4 of a mixing impeller 3. A gas including the solvent generated in the mixing tank is supplied into a condenser 6 via a delivery pipe 5. The gas is cooled by a cooling water flowing through a cooling water line 7 of the condenser 6. Thus condensed solvent flows downward through a drain pipe 8 of the condenser 6 to enter a drain recovery tank 9 disposed in a lower position.

A part of the solvent, which has not condensed in the condenser 6, is taken into a vacuum pump 12 together with the gas through a suction line 11 having a check valve 10.

The rotation of a driving motor 13 of the vacuum pump 12, which is transmitted to a rotational shaft 12a of the vacuum pump 12 via a coupling 14, compresses the gas including the solvent up to an atmospheric pressure to deliver the gas into a discharge line 15. Then, the gas passes through a silencer 16 disposed at a leading end of the discharge line 15 to be discharged into the atmosphere.

The condensed solvent accumulates in the discharge line 15 during the gas compression up to the atmospheric pressure. This brings the disadvantage that the accumulation flows backward into the vacuum pump 12 or that a back pressure arises due to the blockage of a rising pipe 15a of the discharge line 15, which may undesirably cause an over load of the vacuum pump 12.

To eliminate these disadvantages, there have been provided a drain tank 17 disposed in a position lower than the vacuum pump 12, a drain line 18 communicating the discharge line 15 with the drain tank 17, and a drain valve 19 for opening and closing the drain line 18. Thereby, the condensed solvent of the discharge line 15 has been discharged into the drain tank 17 to prevent the backward flow of the condensed solvent into the vacuum pump 12 and the back-pressure generation.

The reference numeral 20 designates a backward flow type cooler provided in the discharge line 15. Such vacuum pump 12 requires a discharge line provided with the silencer 16 for noise reduction of the gas before discharging the gas into the atmosphere and the drain tank 17 for recovering the condensed solvent accumulated in the discharge line 15. This disadvantageously requires a larger installation space for a discharge line system of the gas and increases a manufacturing/installation cost of the discharge line system.

An object of the present invention is to eliminate these disadvantages.

SUMMARY OF THE INVENTION

For achieving the object, a silencer with a drain recovery device according to the invention includes an enclosed tank, an inlet port positioned at one end of the tank, a discharge port positioned at another end of the tank, a partition plate separating an inner space of the tank into an inlet side chamber and an outlet side chamber. The partition plate is formed with an orifice communicating the separated chambers with each other. The partition plate has a lower end portion provided with a drain hole communicating with both the chambers. The inlet port is connected to a discharge line of a vacuum pump.

This configuration enables the silencer, which reduces a noise of a gas discharged into the atmosphere, to separate and recover a drain of the gas.

The tank is located at a position lower than the vacuum pump. The inlet side chamber of the tank is connected to a lower end of a drain discharge line communicating with a lower portion of a casing of the vacuum pump.

Thus configured silencer allows a noise reduction of a gas discharged into the atmosphere and enables separation/recovery of a drain of the gas discharged from the vacuum pump. The silencer also has the function of recovering a drain accumulated in the vacuum pump.

The tank may have a cooling water jacket for cooling a wall of the tank. The provision of the cooling water jacket cools a gas discharged from the vacuum pump to enhance condensation of a drain of the gas, improving separation of the drain.

Furthermore, the tank may be provided with a drain discharge line for discharging a drain accumulated in the tank and a shut-off valve for opening and closing the drain discharge line, which allows the discharge of the drain in the tank with ease.

BEST MODE EMBODYING THE INVENTION

Figure 1:
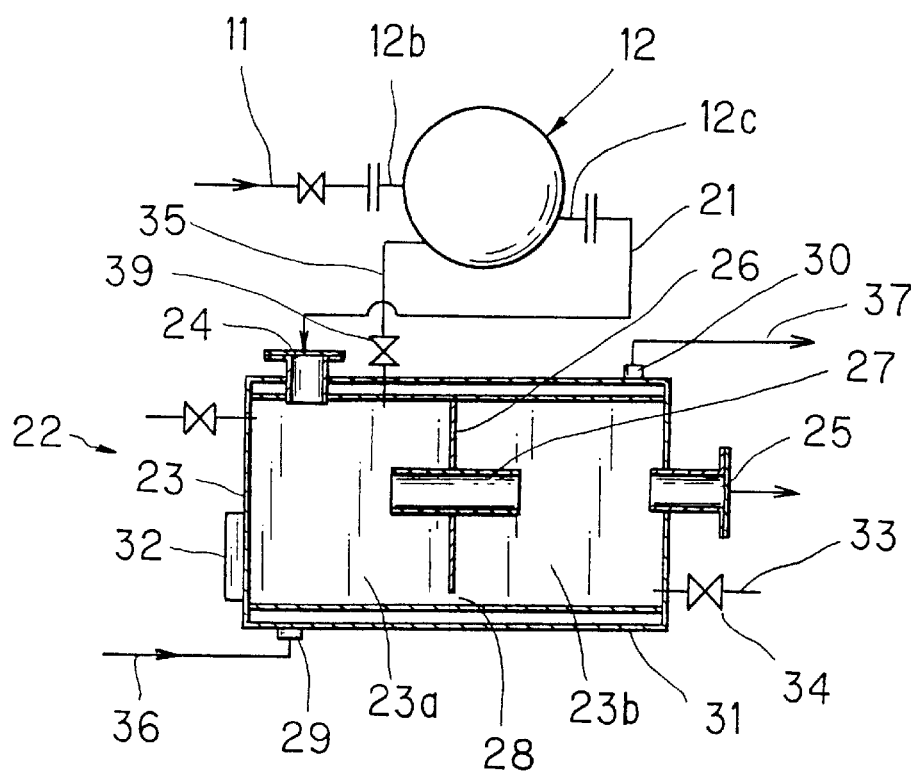
FIG. 1 is a general longitudinal sectional view showing a silencer disposed in a discharge line of a vacuum pump.
Figure 2:
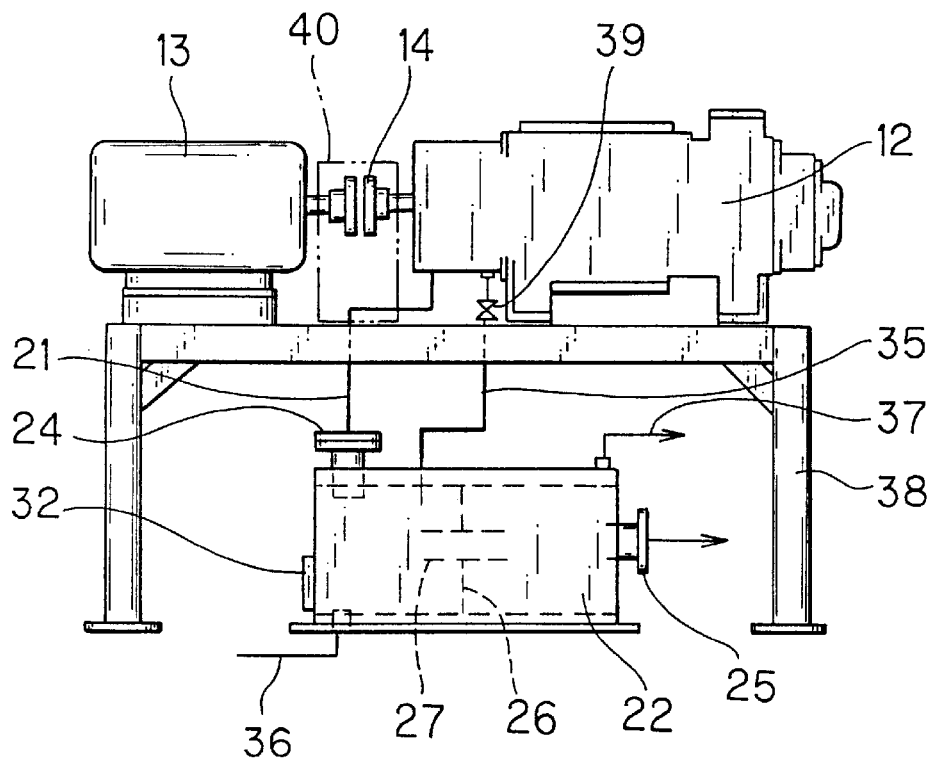
FIG. 2 is a front view showing a general arrangement of a discharge line system of the vacuum pump.
Figure 3:
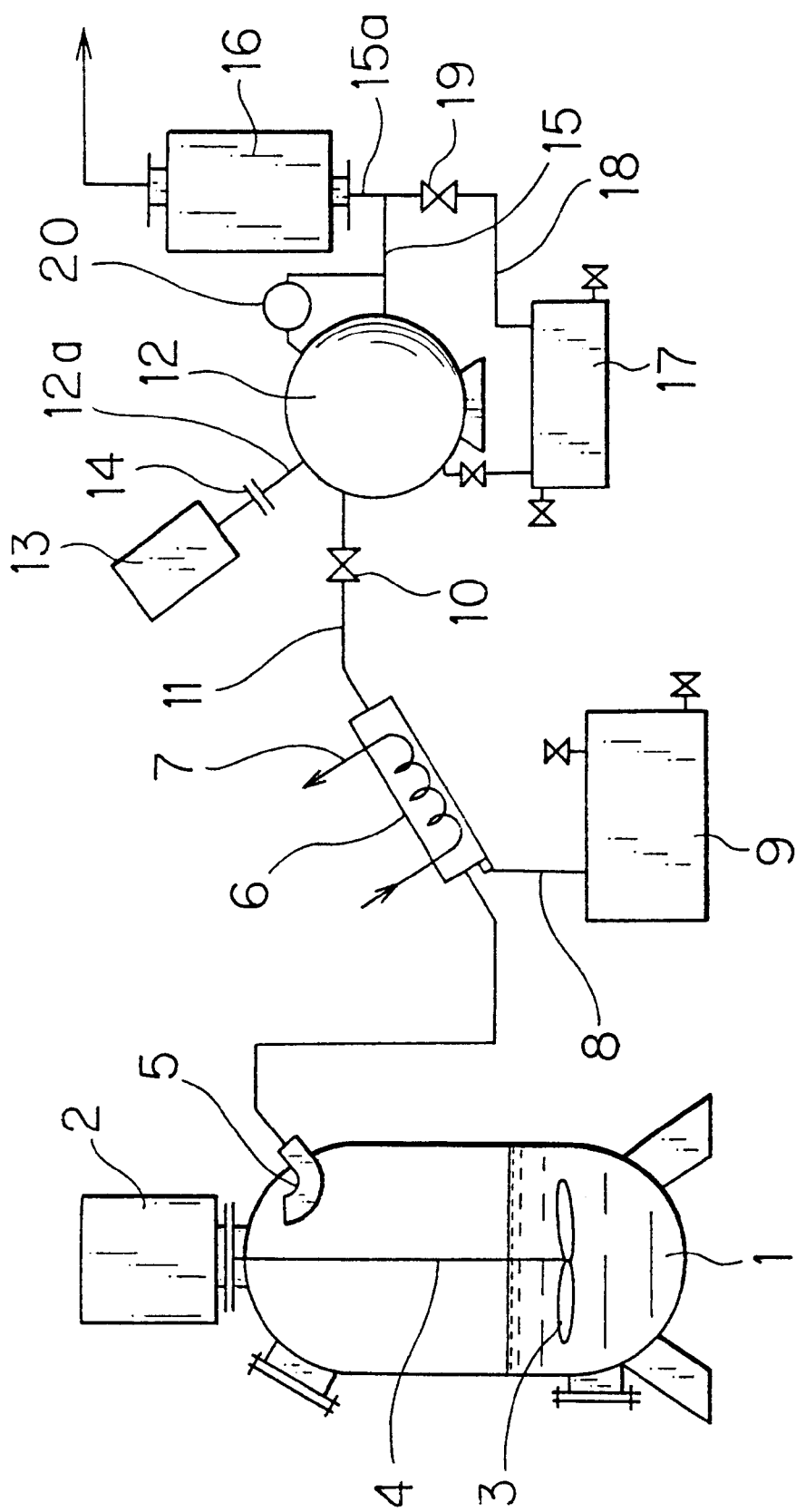
FIG. 3 is an illustration of a discharge line system of a vacuum pump for suction of a gas including a solvent.

Referring to the drawings an embodiment of the present invention will be discussed hereinafter. FIG. 1 is a general longitudinal sectional view showing a silencer 22 disposed in a discharge line 21 of a vacuum pump 12, and FIG. 2 is a front view showing a general arrangement of a discharge line system of the vacuum pump 12.

The silencer 22 has an enclosed tank 23. The tank 23 has an inlet port 24 in one side (in the left side of FIG. 1) of the tank 23 at a top portion thereof. The tank 23 also has a discharge port 25 in another side of the tank 23.

In the tank 23, there is provided a partition plate 26 for separating an inner space of the tank 23 into an inlet port side and a discharge port side. The partition plate 26 has a tube penetrating through the partition plate 26. The tube defines a orifice 27 communicating a first chamber 23a located in the inlet port side with a second chamber 23b located in the discharge port side. The partition plate 26 has a lower end portion provided with a drain flow hole 28 communicating the first and second chambers with each other.

The tank 23 is provided with a cooling water jacket 31. The cooling water jacket 31 has an inlet 29 and an outlet 30 for a cooling water. The cooling water inlet 29 is connected to a cooling water supply line 36, and the cooling water outlet 30 is connected to a cooling water discharge line 37.

The tank 23 has a level gauge 32 on a side wall thereof and a drain discharge line 33 provided with a shut-off valve 34.

The inlet port 24 is connected to the discharge line 21 of the vacuum pump 12. The first chamber 23a of the tank 23 is connected to a lower end of a drain line 35 communicating with an inner space of the vacuum pump 12. The drain line 35 is provided with a shut-off valve 39.

As illustrated in FIG. 2, the vacuum pump 12 and a driving motor 13 are fixed on a base frame 38. The driving motor 13 and the vacuum pump 12 are coupled to each other through a coupling 14. The coupling 14 is covered by a safety cover 40 having a lower end portion secured on the base frame 38. The silencer 22, which serves as the conventional silencer 16 and as the drain tank 17, is secured on a lower potion of the base frame 38.

Referring to FIG. 1, thus configured silencer 22 for the vacuum pump will be discussed in operation thereof.

As well as the conventional vacuum pump, a solvent including gas is taken into a suction port 12b of the vacuum pump 12 from a suction line 11 and is increased in pressure to be delivered into the first chamber 23a of the tank 23 from a discharge port 12c of the vacuum pump 12 via the discharge line 21.

The delivered gas in the first chamber 23a is cooled by contacting an inner wall of the tank 23 which is of a low temperature due to a cooling water, enhancing condensation of the solvent.

The condensed solvent accumulated in a discharge side of the vacuum pump 12 is dropped into the first chamber 23a through the drain line 35 when the shut-off valve 39 is appropriately opened.

The condensed solvent is accumulated in a bottom of the first chamber 23a, and the remaining gas is compressed when it passes through the orifice 27 from the first chamber 23a. The gas expands when it enters the second chamber 23b. A snubber effect due to the expansion causes a rapid energy loss of a noise generated by the flow of the gas and enhances condensation of the solvent.

Thus, almost all of a gas discharged from the discharge port 25 is non-condensable. This eliminates the problems of the conventional one that the condensed solvent flows backward into the vacuum pump 12 and that the condensed solvent causes the blockage of a rising portion of a discharge pipe passage to generate a back-pressure which causes an over load of the vacuum pump 12.

The solvent including gas in the second chamber 23b contacts an inner wall of the tank 23 which is cooled by a cooling water, enhancing condensation of the solvent. The condensed solvent drops on a bottom of the second chamber 23b to be accumulated as a drain. The drain accumulated in the first chamber 23a and the drain accumulated in the second chamber 23b have the same height as each other because of the drain hole 28. The drain height is determined by a level gauge 32, and the drains are discharged from the chambers to the outside when the shut-off valve 34 is opened at a predetermined level of the drains.

As discussed above, the silencer 22 can reduce a noise of a gas discharged from the discharge line 21 and serves to separately recover a drain of the gas in the discharge line 21. This requires no conventional silencer separately disposed.

This provides a simplified general arrangement of the discharge line system of the vacuum pump, advantageously reducing a manufacturing cost thereof and enabling a reduced space for arranging the discharge system of the vacuum pump.

INDUSTRIAL APPLICABILITY OF THE INVENTION

The vacuum pump with the drain recovery device according to the present invention is constituted as discussed above and has operational effects described hereinafter.

(1) In the vacuum pump according to the invention, the tank is formed with the partition plate located between the inlet port disposed in one side of the tank and the discharge port disposed in another side of the tank. The orifice provided in the partition plate reduces a noise generated by a gas discharged from the vacuum pump and enhances almost all of the discharged gas to become non-condensable by separating a drain of the discharged gas.

(2) Since the vacuum pump achieves a high separation rate of the drain, almost all of the discharged gas of the vacuum pump becomes non-condensable. This eliminates the problems of the conventional vacuum pump that the condensed solvent flows backward into the vacuum pump and that the blockage of the discharge line may occur to cause an over load of the vacuum pump.

(3) The silencer according to the present invention is positioned in place of a conventional drain tank. This eliminates an installation space of a conventional silencer, allowing a simplified, compact general arrangement of the discharge line system. Thus, the discharge line system of the vacuum pump is advantageously reduced in a manufacturing cost thereof and allows a smaller installation space thereof.

(4) The drain hole provided in a lower end portion of the partition plate of the tank keeps the drain accumulated in each side of the partition plate at the same level as each other. The noise reducing silencer also has a function of recovering a drain of the handling gas.

(5) The provision of the cooling water jacket for cooling the tank of the silencer cools the gas in the tank, enhancing separation of a drain of the gas.

What is claimed is:

1. A silencer with a drain recovery device comprising:

an enclosed tank having an inlet port positioned at one side of said tank and a discharge port positioned at another side of said tank; and a partition plate separating an inner space of said tank into an inlet side chamber and an outlet side chamber, said inlet port being connected to a discharge line of a vacuum pump, wherein said partition plate is formed with an orifice communicating the inlet side chamber with the outlet side chamber, and said partition plate having a lower end portion provided with a drain hole communicating with both the inlet side chamber with the outlet side chamber, said tank is located at a position lower than said vacuum pump, and the inlet side chamber of said tank is connected to a lower end of a drain discharge line communicating with a lower, inner portion of said casing of the vacuum pump.

2. The silencer set forth in claim 1, wherein said tank has a cooling water jacket for cooling a wall of said tank.

3. The silencer set forth in claim 1, wherein said tank is provided with a drain discharge line for discharging a drain accumulated in said tank and a valve for opening and closing the drain discharge line.

4. A silencer with a drain recovery device comprising:

an enclosed tank having an inlet port positioned at one side of said tank and a discharge port positioned at another side of said tank; and a partition plate separating an inner space of said tank into an inlet side chamber and an outlet side chamber, said inlet port being connected to a discharge line of a vacuum pump, wherein said partition plate is formed with an orifice communicating the inlet side chamber with the outlet side chamber, and said partition plate having a lower end portion provided with a drain hole communicating with both the inlet side chamber with the outlet side chamber, said tank having a cooling water jacket for cooling a wall of said tank and enhancing condensation of a gas discharged from the vacuum pump.

5. The silencer set forth in claim 4, wherein said tank is provided with a drain discharge line for discharging a drain accumulated in said tank and a valve for opening and closing the drain discharge line.

* * * * *